Nov. 21, 1967   R. A. HAWKINS   3,353,399

SHOCK TESTING MACHINE

Filed June 1, 1964

ROBERT A. HAWKINS
INVENTOR.

BY *Alden D Redfield*
*Abraham Ogman*
ATTORNEYS 3,353,399
SHOCK TESTING MACHINE
Robert Alexander Hawkins, Topsfield, Mass., assignor to Avco Corporation, Cincinnati, Ohio, a corporation of Delaware
Filed June 1, 1964, Ser. No. 371,380
6 Claims. (Cl. 73—12)

This invention relates, generally, to shock testing machines and, in particular, to shock testing machines wherein a member is accelerated by elastic tension means.

This invention relates very generally to gravity drop shock testing machines such as illustrated in Patent No. 2,740,286, wherein a movable member or carriage is raised above an anvil mounted on a foundation. The foundation is generally a large mass such as a seismic block, such as concrete or steel.

Shock testing machines which depend solely on gravity for acceleration will usually have a limited terminal velocity which is determined primarily by the height of the shock machine supporting structure. To increase the terminal velocity, elastic means are secured between the movable member or carriage and the immovable member or foundation. When a carriage is raised, the elastic means is stretched and placed under tension and stores energy, and when the carriage is released it is accelerated to impact against a foundation by the elastic means releasing its stored energy. Obviously, the foregoing is analogous to the action of a rubber band which is first stretched and then released.

One of the problems commonly encountered in machines accelerated by elastic means relates to balancing the stored energy in a plurality of elastic bands interconnecting the carriage and the foundation. A slight difference in stored energy generates a rotational moment which tends to skew the carriage. Skewing can seriously affect the reliability as well as the instantaneous test results. In particular, repeatability of test parameters cannot be assured.

It is an object of the invention to provide a shock testing machine using an elastic accelerating means which avoids the limitations and disadvantages of prior machines of this type.

Other objects of the invention are to provide a shock testing machine using elastic accelerating means which:

(1) Includes provisions which greatly simplify generating balanced acceleration forces;

(2) Materially reduces the number of adjustments required;

(3) Neutralizes the effects of unbalanced acceleration forces generated by energy stored in elastic elements;

(4) Includes an arrangement wherein unbalanced skewing moments are eliminated or reduced to a minimum; and (5) Greatly simplifies the operation and construction of this type of machine without significantly increased complexity or cost.

In accordance with the invention, in a shock testing machine where a movable member is propelled to impact against an immovable member by elastic tension means, the tension means is connected to one of the aforementioned movable or immovable members at two points equidistant from the center of rotation of one of the members. The two points are situated on an axis passing through the center of rotation. The tension member is also slidably secured to the remaining member.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
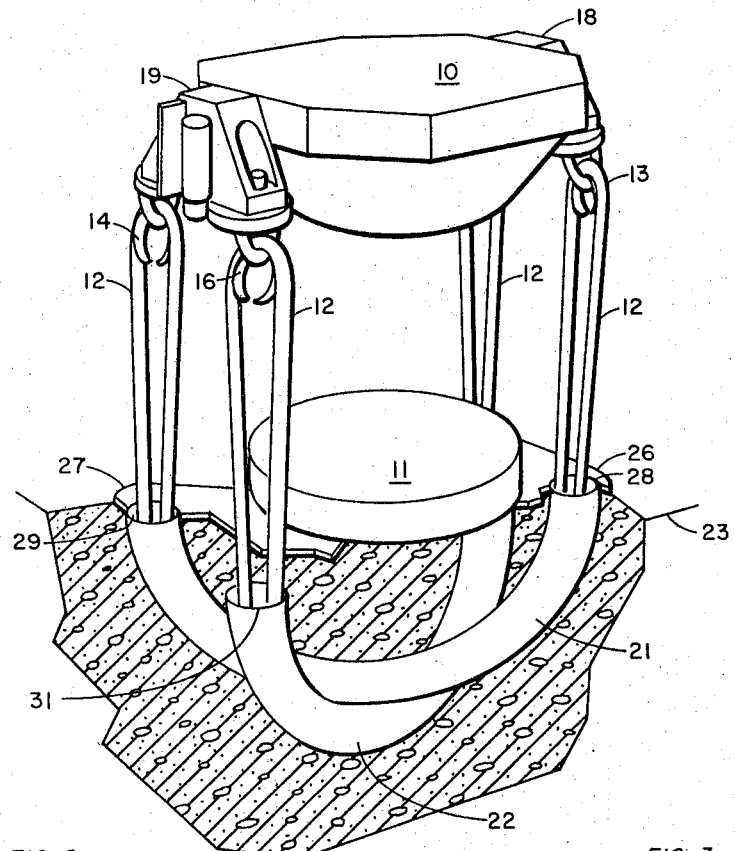
FIGURE 1 is a pictorial representation of a shock machine carriage and elastic tension means.

FIGURE 1 is a pictorial representation of a portion of a shock machine containing a carriage 10, a seismic anvil 11 mounted on a concrete foundation 23 on which the carriage is impacted, and elastic tension means 12.

The supporting structure lifting means, anti-rebound devices typically found in shock testing machines, have been deliberately omitted from FIGURE 1 since they do not enter into the invention and the specific structural features of these members in relation to the carriage 10 are not a feature of the invention. The carriage 10 includes four bearings 13, 14, 16 and 17. Bearing 17 does not appear in FIGURE 1 but is shown schematically in FIGURES 2 and 3. Pairs of bearings are symmetrically located with respect to a center of rotation of the carriage as will be explained hereafter. Although the discussion which follows will refer to the illustrated embodiment, the principles described herein apply equally to configurations having one or more than two elastic means 12. The bearings 13, 14, 16 and 17 are secured to the carriage 10 by means of brackets 18 and 19. Specifically, bearings 13, 14, 16 and 17 are annular devices having a concave cross section to permit relative motion between the bearings and the tension means.

A pair of arcuate tubes 21 and 22 are buried within the foundation 23 and are positioned therein such that their openings lie in the plane of a pair of plates 26 and 27 on the surface of the foundation 23. These openings designated 28, 29, 30 and 31 (not shown) are preferably positioned vertically beneath the bearings 13, 14, 16 and 17 respectively.

Referring to FIGURE 1, it will be noted that each of the elastic tension means 12 comprises an endless rubber band which passes through one of the arcuate tubes 21 or 22 and bearings 13 and 14 or bearings 16 and 17.

In the alternative, the tension means 12 may consist of an elastic filament which is trained through an arcuate sleeve 21 or 22 with each end terminated in a non-slidable connection on the carriage where the bearings 13 and 14 or bearings 16 and 17 are presently located.

When the carriage 10 is raised above the anvil 11, the tension members 12 are stretched and thus store energy. When the carriage is released, the elastic means tend to move in a direction to release the stored energy, thereby accelerating the carriage 10 to impact against anvil 11. The terminal velocity of the carriage 10 depends on the elastic properties of the elastic means 12 as well as the energy stored therein when carriage 10 is raised.

Assume for the moment that the carriage 10 is to be propelled by four separate and distinct elastic elements. Obviously, upon raising the carriage 10, thereby storing energy in the elastic elements, care must be taken that the forces exerted on the carriage at each bearing by the stretched elastic elements are equal. Additionally, if skewing is to be avoided, the elastic elements must have equivalent relaxation characteristics; this is generally inherent and difficult if not impossible to compensate for.

Greater reliability and repeatability can be achieved by neutralizing the effect of unbalanced stored energies and forces.

Figure 2:
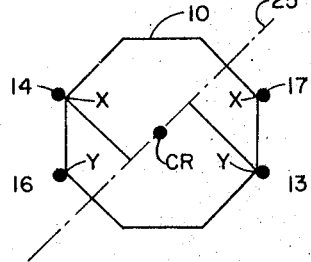
FIGURE 2 is a force and moment diagram useful in explaining the invention.

Referring to FIGURE 2 of the drawings, there is depicted a force diagram which will be used to explain the benefits derived from applicant's invention as well as its operation.

X and Y represent acceleration forces that will be applied to the bearings 13, 14, 16 and 17 resulting from stored energy in tension means 12 attached to the respective bearings. The force arrangement is purely arbitrary and chosen to illustrate a point.

It will be noted that the moments of force X and Y associated with bearings 14 and 16 about an axis 25 differ from the moments about the same axis resulting from forces X and Y associated with bearings 13 and 17. The axis 25 is an arbitrary one having only one important criteria, namely that it passes through the center of rotation CR of the carriage 10. The center of rotation is defined as the point about which a carriage will tend to rotate, if permitted to do so by applied forces. In this case, the forces are distributed on the periphery of the carriage 10. Because of the symmetrical geometric configuration of the carriage 10, the center of rotation CR is obviously also the geometric center of the carriage.

It follows from the foregoing that the unbalanced moment about the axis 25, or any axis passing through the center of rotation CR, will tend to skew the carriage 10, introducing spurious effects into the performance of the shock testing machine.

Figure 3:
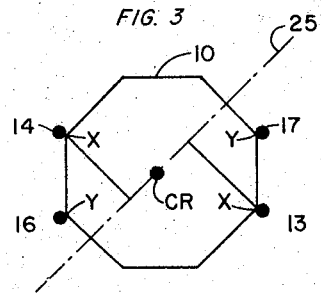
FIGURE 3 is a second force and moment diagram also useful in explaining the invention.

A similar force diagram is provided in FIGURE 3. In this case, forces XX and YY are associated with bearings 13 and 14 and bearings 16 and 17 respectively. It will be noted that equal forces are symmetrically disposed with relation to the center of rotation CR on a line passing through the center of rotation. In this case, the moments about an axis 25 are balanced, and under ideal conditions there will be no resultant moment which will tend to rotate the carriage 10.

An additional benefit of the FIGURE 1 embodiment is the advantage gained by reducing the number of independent tension members by half in comparison with machines of this type which use separate and distinct tension means at each bearing. Not only are the number adjustments reduced in half, but the forces applied at each pair of bearings are inherently equalized.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. In a shock testing machine comprising an immovable member, a planar movable member having transverse axis of symmetry and having at least two connection points symmetrically disposed about said axis and elastic tension means attached to said connection points and to said immovable member, the improvement of providing at least one arcuate tube having an open end disposed in the line of travel of each of said connection points, said elastic tension means fixedly attached at two opposite connection points and trained through said arcuate tube, whereby said movable member has equal forces acting at each connecting point when said movable member is propelled to impact against said immovable member.

2. The improvement in shock testing machines as described in claim 1 modified so that said elastic tension means is endless and looped over the two opposite connecting points in a sliding attachment.

3. In a shock testing machine comprising two members that are adapted to impact against each other said members having centers of rotation through which passes an axis defining the direction of travel of one member to the other, and tension means interconnecting said members for propelling the members toward each other, the improvement comprising tension means passing from one of said members to the other of said members behind said other member, and then back to said one member guide means for said tension member behind said other member; and connecting means on said members located in a symmetrical relationship with respect to said axis and connected to said tension means for allowing the development and maintenance of a uniform tension force along the length of the tension means when said members are spaced from one another or moving toward one another, whereby equal propelling forces are created in a symmetrical relationship with respect to said axis.

4. In a shock testing machine comprising a movable member that is to be propelled to impact against an immovable member said movable member having a center of rotation through which passes an axis defining the direction of travel of the movable member to the immovable member, at least one pair of connecting means on one of said members and at least one complementary sliding connecting means on said other member located in a symmetrical relationship with respect to said axis; and a single continuous elastic tension means passing from one of said pair of connecting means to said complementary connecting means on the other of said members and back to said other of said pair of connecting means for allowing the development and maintenance of a uniform tension force along the length of the tension means when said members are spaced from one another or moving toward one another whereby said movable member has equal forces acting at each connecting means when said movable member is propelled to impact against said immovable member.

5. In the improvement in shock testing machines in claim 4 in which said elastic tension means is fixedly attached to connecting points oppositely disposed with respect to said axis on one of said members and slidably connected at at least one point on said other member.

6. The improvement in shock testing machines as described in claim 4 in which said elastic tension means is endless and slidably connected to each of said members at at least one point.

References Cited

UNITED STATES PATENTS

| 1,604,141 | 10/1926 | Amsler | 73—12 |
| 2,630,704 | 3/1953 | Armstrong | 73—12 |
| 2,664,743 | 6/1954 | Schmidt | 73—79 |
| 2,740,286 | 4/1956 | De Vost | 73—12 |

RICHARD C. QUEISSER, *Primary Examiner.*

J. H. WILLIAMSON, *Assistant Examiner.*